(12) United States Patent
Lee et al.

(10) Patent No.: US 9,096,278 B2
(45) Date of Patent: Aug. 4, 2015

(54) ACTIVE AIR FLAP DEVICE FOR VEHICLES

(71) Applicant: Hyundai Motor Company, Seoul (KR)

(72) Inventors: Jung Joong Lee, Ansan-si (KR); Seung Hyeob Lee, Ansan-si (KR); Phil Jung Jeong, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 36 days.

(21) Appl. No.: 14/014,061

(22) Filed: Aug. 29, 2013

(65) Prior Publication Data

US 2014/0346809 A1 Nov. 27, 2014

(30) Foreign Application Priority Data

May 22, 2013 (KR) .................. 10-2013-0057478

(51) Int. Cl.
*B60K 11/00* (2006.01)
*B62D 35/00* (2006.01)
*B60K 11/08* (2006.01)

(52) U.S. Cl.
CPC .............. *B62D 35/00* (2013.01); *B60K 11/085* (2013.01)

(58) Field of Classification Search
USPC ............................... 180/68.1–68.6
See application file for complete search history.

(56) References Cited

U.S. PATENT DOCUMENTS

| 8,302,715 B2 | 11/2012 | Lee et al. |
| 2012/0132474 A1* | 5/2012 | Charnesky et al. .......... 180/68.1 |

FOREIGN PATENT DOCUMENTS

| JP | 2010-260542 A | 11/2010 |
| JP | 2011-88584 A | 5/2011 |
| KR | 10-2011-0049994 A | 5/2011 |
| KR | 10-2011-0056924 A | 5/2011 |
| KR | 1020120106034 A | 9/2012 |

* cited by examiner

*Primary Examiner* — John Walters
*Assistant Examiner* — James Triggs
(74) *Attorney, Agent, or Firm* — Morgan, Lewis & Bockius LLP

(57) ABSTRACT

An active air flap device for vehicles includes a first flap installed in the front end of a vehicle and is configured such that the first flap is rotated by power of an actuator so as to be opened or closed, a second flap installed at a location around the first flap and configured such that the second flap is rotated so as to be opened or closed, and a link module connected to the first flap at a first end thereof and connected to the second flap at a second end thereof, and configured such that the link module is moved upward and downward, with a regulation unit provided in a central portion of the link module so that the regulation unit can connect or disconnect a link of the first flap to or from a link of the second flap.

5 Claims, 5 Drawing Sheets

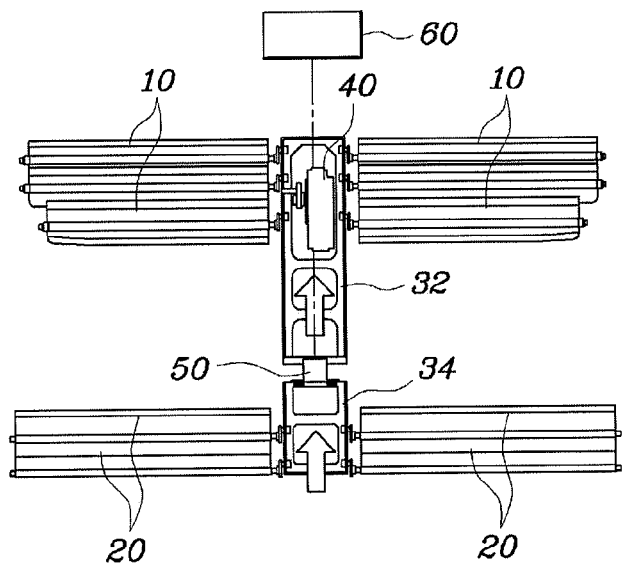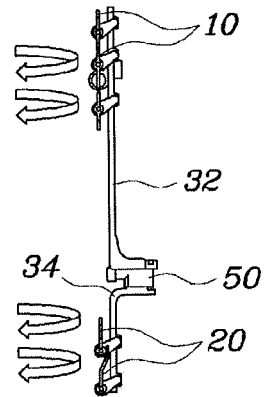
*FIG. 5A*  *FIG. 5B*
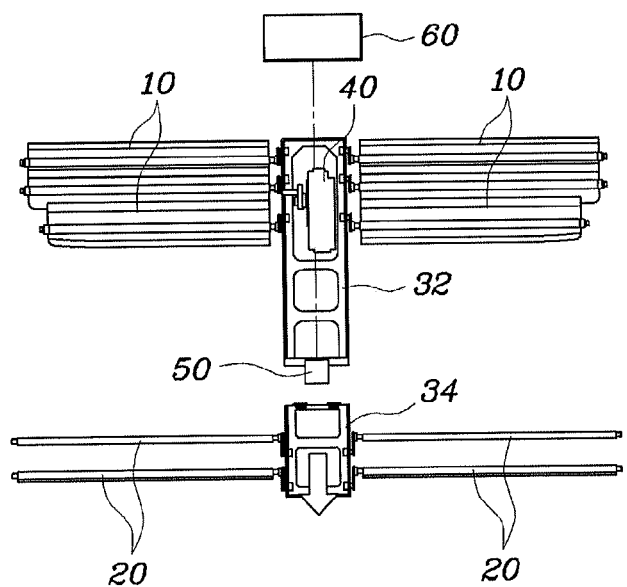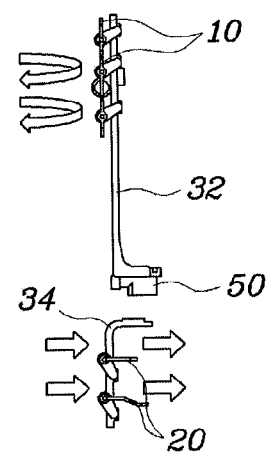
*FIG. 6A*  *FIG. 6B*

ACTIVE AIR FLAP DEVICE FOR VEHICLES

CROSS-REFERENCE TO RELATED APPLICATION

The present application claims priority of Korean Patent Application Number 10-2013-0057478 filed May 22, 2013 the entire contents of which application is incorporated herein for all purposes by this reference.

BACKGROUND OF INVENTION

1. Field of Invention

The present invention relates, in general, to active air flap devices for vehicles and, more particularly, to an active air flap device for vehicles which can maximize the aerodynamic performance of a vehicle, thereby increasing the mileage of the vehicle, and can provide a fail-safe function to the vehicle, thereby realizing improved driving safety of the vehicle.

2. Description of Related Art

Generally, an air intake unit that is installed in the front end of a vehicle comprises upper and lower parts separated from each other based on a front bumper back beam. In the related art, active air flap devices that are currently used in the air intake units are classified into the following types of devices.

As shown in FIG. 1, a first type of active air flap device in which one active air flap 1 is installed exclusively in one of the upper and lower parts of the air intake unit is advantageous in that the device has a simple system construction. Another advantage of the first type of active air flap device resides in that a regular cooling surface is formed in a part having no active air flap, and so the active air flap device can provide an improved fail-safe function. However, in the first type of active air flap device, the active air flap is installed in only one of the upper and lower parts of the air intake unit, and so the active air flap device cannot provide a desired air blocking rate, thereby being limited with regards to improvement of the aerodynamic performance and mileage of a vehicle.

A second type of active air flap device, in which respective active air flaps are installed in the upper and lower parts of the air intake unit, with a link connected between the upper and lower active air flaps such that the upper and lower active air flaps can be operated simultaneously using one actuator, is advantageous in that the upper and lower parts of the air intake unit can be opened simultaneously, thereby realizing improved aerodynamic performance of a vehicle when the vehicle is being driven.

However, the second type of active air flap device is problematic in that, when the system of this active air flap device malfunctions in a state in which the upper and lower active air flaps are closed, a user should manually open the flaps after stopping the vehicle and this is inconvenient to the user. Further, the operation of manually opening the flaps is difficult, and so it is not easy to manually open the flaps. Further, when the flaps are not opened, it causes a critical problem in that the vehicle may not be driven.

In the related art, Korean patent application publication No. 10-2012-0106034 proposes "an active air flap".

However, the technique disclosed in Korean patent application publication No. 10-2012-0106034 is problematic in that it cannot improve the aerodynamic performance of a vehicle, thereby failing to increase the mileage of the vehicle.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention has been made keeping in mind the above problems occurring in the related art, and the present invention is intended to propose an active air flap device for vehicles which can appropriately control the air blocking rate that can block air flowing from the front of a vehicle when the vehicle is being driven, thereby improving the aerodynamic performance of the vehicle, and which can provide a sufficient cooling surface area required to cool a variety of cooling systems when the vehicle is being stopped, thereby reliably providing the minimum cooling surface area without forcing a user to separately manipulate air flaps when a system-fail is generated, and so the active air flap device can provide improved driving efficiency and improved driving safety.

Various aspects of the present invention provide for an active air flap device for vehicles, including: a first flap installed in a front end of a vehicle and is configured such that the first flap is rotated by power of an actuator so as to be opened or closed; a second flap installed at a location around the first flap and configured such that the second flap is rotated so as to be opened or closed; and a link module connected to the first flap at a first end thereof and connected to the second flap at a second end thereof, and configured such that the link module is moved upward and downward, with a regulation unit provided in a central portion of the link module so that the regulation unit can connect or disconnect a link of the first flap to or from a link of the second flap.

Here, the link module may include: a first link to a side of which an end of the first flap is connected so that, when the first link is moved upward or downward, the first link rotates the first flap so as to open or close the first flap; and a second link installed at a location below the first link such that the second link is detachably attached to the first link, in which an end of the second flap is connected to a side of the second link so that, when the second link is moved upward or downward, the second link rotates the second flap so as to open or close the second flap, and the regulation unit is a solenoid that is installed in an end of the first link or in an end of the second link which faces the end of the first link, and so the solenoid can connect or disconnect the first link and the second link to or from each other by whether electric power has been applied to the solenoid or not.

Further, a metal plate that can be magnetically attached to a magnet may be installed in the end of the first link which faces the solenoid or in the end of the second link which faces the solenoid.

Further, the second flap may be mounted to a rotating shaft that is provided in a first end of a lever; and the second link may be connected to a second end of the lever, and so, when the second link is disconnected from the first link, the second end of the lever is rotated downward around the rotating shaft by a weight of the second link, thereby opening the second flap.

The active air flap device for vehicles may further include: a control unit that is connected to the solenoid and outputs a signal so as to apply or cut off the electric power to or from the solenoid.

Here, the control unit may control such that, when the electric power is applied to the solenoid, the first link and the second link are connected to each other and the first flap and the second flap are opened or closed in conjunction with each other by the power of the actuator; and when the electric power is cut off from the solenoid, the first link and the second link are disconnected from each other, and the second flap is rotated by a weight of the second link, thereby being automatically opened.

As described above, the present invention can control the first and second flaps that are installed in the upper and lower parts of the air intake unit, in such a way that the first and second flaps can be opened or closed in conjunction with each other, and so the present invention can appropriately control the blocking rate of air flowing from the front of a vehicle when the vehicle is being driven, according to driving conditions and driving environments. Therefore, when the vehicle is being driven at a high speed, the present invention can minimize air resistance by maximizing the air blocking rate, thereby improving the aerodynamic performance of the vehicle and increasing the mileage of the vehicle. Further, when the vehicle is being stopped or is being driven at a low speed, the present invention can provide a sufficient cooling surface area required to cool a variety of cooling systems, thereby improving the cooling performance of the vehicle.

Further, when it is required to open the lower flap that is the second flap while maintaining the closed state of the upper flap that is the first flap, the second flap is automatically controlled by a solenoid so as to be maintained in an open state, thereby providing a minimum cooling surface area without requiring manual manipulation of a user in an emergency, such as a system-fail. Accordingly, the present invention can realize improved driving safety of the vehicle and can provide improved driving efficiency to a driver.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 5A and 5B are front and side views, respectively, illustrating a state in which both the first flap and the second flap are closed simultaneously in a state in which electric power is applied to the solenoid of the active air flap device of FIG. 2;

FIGS. 6A and 6B are front and side views, respectively, illustrating a state in which the first flap is closed while the second flap is naturally opened in a state in which electric power is cut off from the solenoid of the active air flap device of FIG. 2;

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
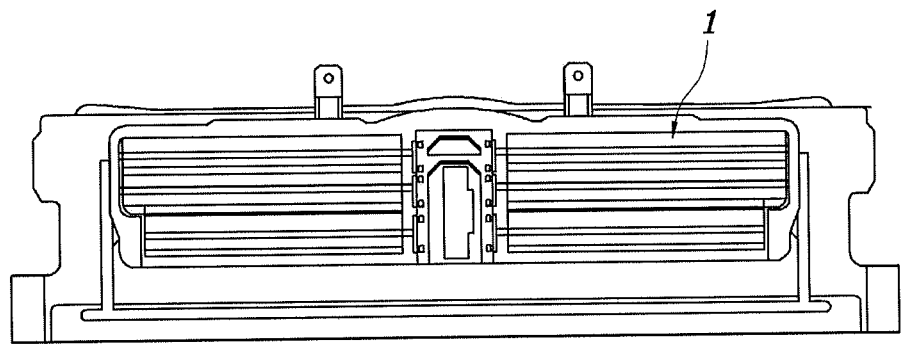
FIG. 1 is a view illustrating a conventional active air flap device for vehicles.
Figure 2:
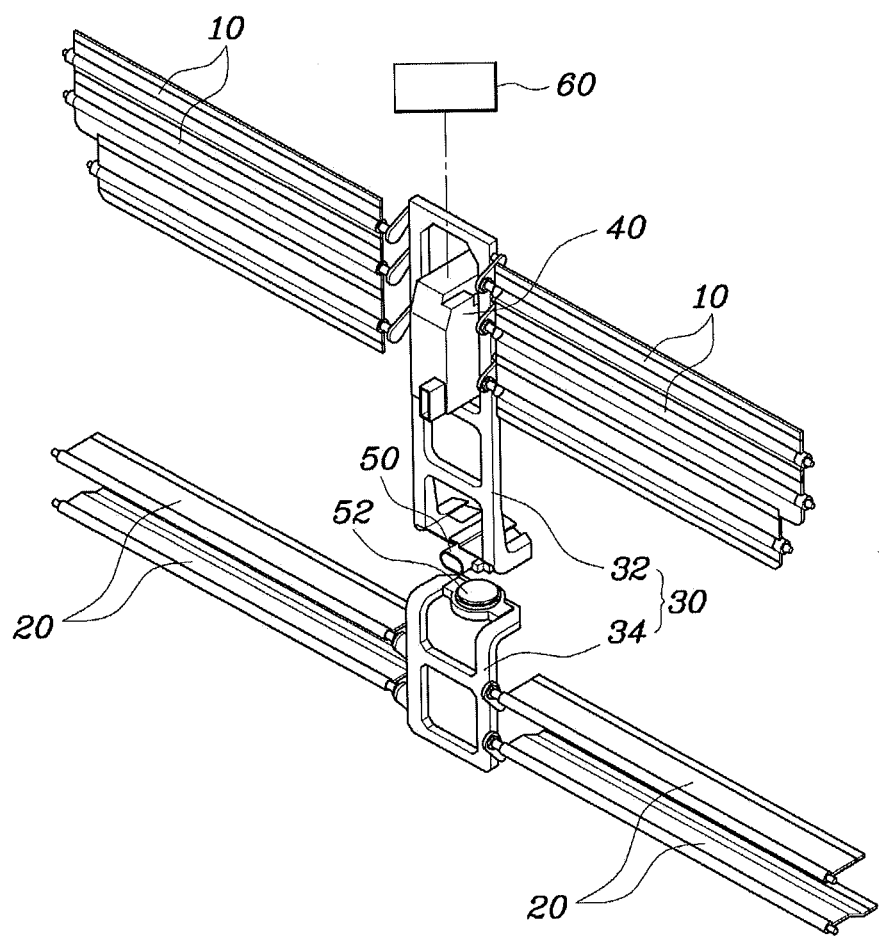
FIG. 2 is a perspective view illustrating the overall shape of an exemplary active air flap device for vehicles according to the present invention.
Figure 3:
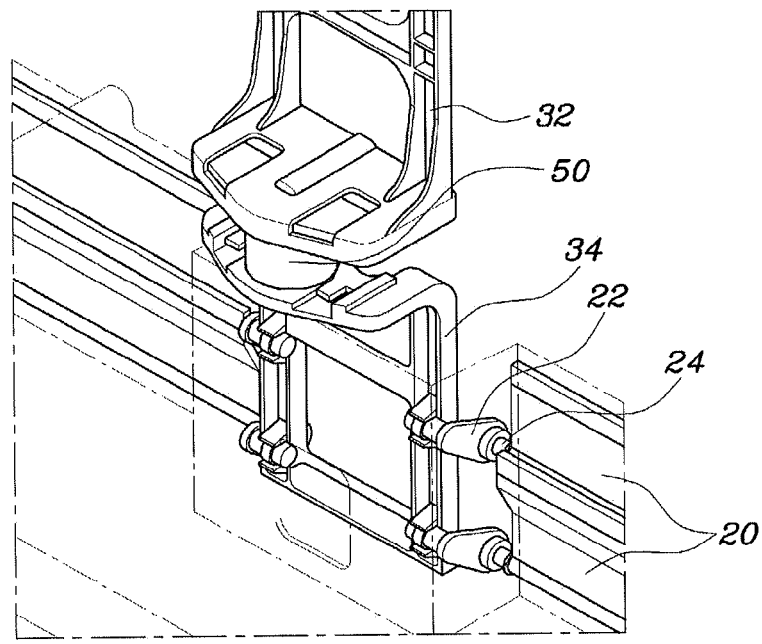
FIG. 3 is an enlarged view illustrating the shape of both a link module and a second flap that are provided in a lower part of the active air flap device of FIG. 2.

FIG. 2 is a perspective view illustrating the overall shape of an active air flap device for vehicles according to the present invention. FIG. 3 is an enlarged view illustrating the shape of both a link module and a second flap that are provided in a lower part of the active air flap device according to the present invention.

The active air flap device for vehicles according to the present invention comprises a first flap 10, a second flap 20, a link module 30, and a regulation unit.

As shown in FIGS. 2 and 3, the active air flap device for vehicles according to the present invention comprises: a first flap 10 that is installed in the front end of a vehicle and is configured such that it can be opened and closed by the power of an actuator 40; a second flap 20 provided at a location around the first flap 10 and configured such that it can be opened and closed; and a link module 30 that is connected to the first flap 10 at a first end thereof and is connected to the second flap 20 at a second end thereof, and is configured such that it can be moved upward and downward, with a regulation unit provided in a central portion of the link module 30 so that the link module 30 can connect or disconnect a link of the first flap 10 to or from a link of the second flap 20.

First, the first flap 10 may be installed in an upper air intake part that is placed in the upper part of a housing of the front end of a vehicle, based on a front bumper back beam. Here, a plurality of first flaps 10 are installed in opposite sides of the upper air intake part in such a way that the first flaps 10 can be rotated around respective central axes, and so the first flaps 10 can control the amount of air that flows into the upper air intake part.

Further, the second flap 20 may be installed in a lower air intake part that is placed in the lower part of the housing of the front end of the vehicle, based on the front bumper back beam. Here, a plurality of second flaps 20 are installed in opposite sides of the lower air intake part in such a way that the second flaps 20 can be rotated around respective central axes, and so the second flaps 20 can control the amount of air that flows into the lower air intake part.

The link module 30 is installed in such a way that it can be connected to or disconnected from the first and second flaps 10 and 20, in which a first link 32 is mounted to the upper end of the link module 30 such that the first flaps 10 can be connected to the upper part of the first link 32, and a second link 34 is mounted to the lower end of the link module 30 such that the second flaps 20 can be connected to the lower part of the second link 34.

In other words, respective ends of the first flap 10 are connected to opposite sides of the first link 32 such that, when the first link 32 is moved upward and downward, the first flaps 10 can be rotated so as to be opened or closed. Further, the second link 34 is removably connected to the lower end of the first link 32, in which respective ends of the second flaps 20 are connected to opposite sides of the second link 34 such that, when the second link 34 is moved upward or downward, the second flaps 20 can be rotated so as to be opened or closed.

The link module 30 may be provided with an actuator 40 that can provide rotation power in normal or reverse direction, and so the link module 30 can be moved upward or downward by the normal or reverse directional rotation power of the actuator 40. When the link module 30 is moved upward or downward, the first flaps 10 or the second flaps 20 can be rotated in opposite directions, thereby opening or closing the upper and lower air intake parts.

The regulation unit is provided in the middle portion of the link module 30 and functions to mechanically connect or disconnect the first link 32 that is provided in the upper end of the link module 30 to or from the second link 34 that is provided in the lower end of the link module 30.

In other words, the present invention opens or closes the first flap 10 and the second flap 20 by operating the actuator 40 or by determining whether electric power is applied to the solenoid 50 or not, according to driving conditions of the vehicle. Accordingly, the present invention can appropriately control the blocking rate of air flowing from the front of the vehicle when the vehicle is being driven, thereby improving the aerodynamic performance of the vehicle and increasing the mileage of the vehicle.

In the present invention, the regulation unit may be the solenoid 50 that is installed in an end of the first link 32 or in an end of the second link 34 which faces the end of the first link 32, and so the solenoid 50 can connect or disconnect the first link 32 and the second link 34 to or from each other by whether electric power has been applied thereto or not.

Here, in the end of the first link 32 which faces the solenoid 50 or in the end of the second link 34 which faces the solenoid 50, a metal plate 52 that can be magnetically attached to a magnet may be installed. Here, the solenoid 50 may be mounted to the lower end of the first link 32, and the metal plate 52 may be mounted to the upper end of the second link 34. Accordingly, the metal plate 52 that is made of iron may be installed in a limited portion at which the link is required to be magnetically connected to the solenoid 50, thereby reducing the weight of the link module 30.

That is, when an electric current is applied to the solenoid 50, the solenoid 50 is electrically activated and becomes an electromagnet, and so the metal plate 52 that is mounted to the upper end of the second link 34 is connected to the solenoid 50, thereby connecting the first link 32 and the second link 34 to each other. However, in a normal state, the electric current is not applied to the solenoid 50, and so electric power is cut off from the solenoid 50 and the first link 32 is disconnected from the second link 34.

The present invention may further include a control unit 60 that is connected to the solenoid 50 and outputs a signal so as to apply or cut off electric power to or from the solenoid 50.

Here, when electric power is applied to the solenoid 50, the control unit 60 controls the solenoid 50 in such a way that the solenoid 50 can connect the first link 32 to the second link 34, and so the first flap 10 and the second flap 20 can be opened or closed in cooperation with each other by the power of the actuator 40. However, when electric power is cut off from the solenoid 50, the first link 32 and the second link 34 are disconnected from each other, and the second flap 20 is rotated by the weight of the second link 34, thereby being opened.

Here, the control unit 60 may be mounted to the actuator 40 so as to control the operation of the actuator 40. In other words, the control unit 60 may control the active air flap device so as to supply or cut off electric power to or from the solenoid 50 while controlling the operation of the actuator 40.

Further, the second flap 20 is mounted to a rotating shaft 24 that is provided in a first end of a lever 22. Here, the second link 34 is connected to a second end of the lever 22, and so, when the second link 34 is disconnected from the first link 32, the second end of the lever 22 can be rotated downward around the rotating shaft 24 by the weight of the second link 34, thereby opening the second flap 20.

That is, when electric power is cut off from the solenoid 50 in a state in which the electric power has been applied to the solenoid 50 and so both the first link 32 and the second link 34 have been moved upward, the solenoid 50 loses an electromagnetic force. In the above state, the gravity center of the second flap 20 is placed above the central axis of the second flap 20, and so the second flap 20 is rotated downward around the central axis thereof by the weight of both the second flap 20 and the second link 34. Accordingly, the second flap 20 is automatically opened and is maintained in the open state.

Hereinbelow, the operation of the present invention will be described with reference to the accompanying drawings.

Figure 4A:
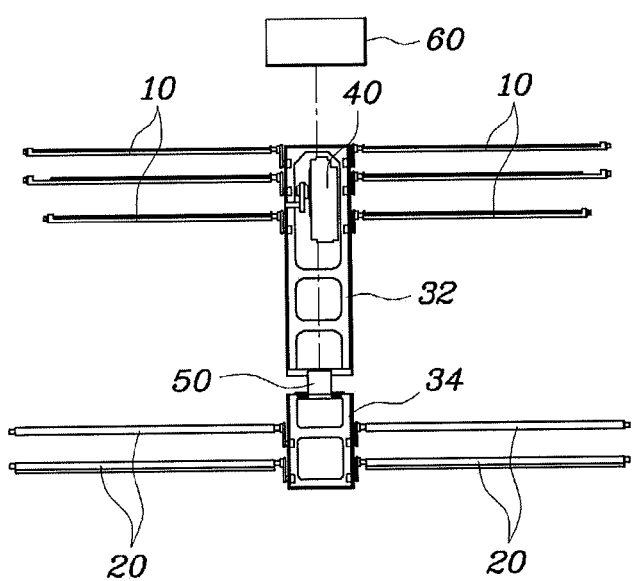
FIGS. 4A and 4B are front and side views, respectively, illustrating a state in which both the first flap and the second flap are opened simultaneously in a state in which electric power is cut off from a solenoid of the active air flap device of FIG. 2.
Figure 4B:
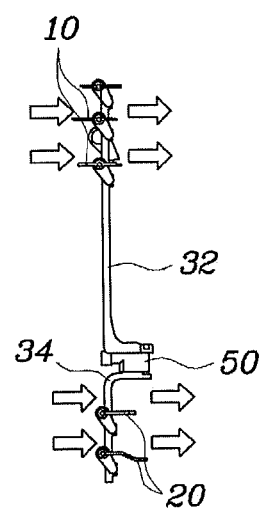

FIG. 4 is a view illustrating a state in which both the first flap 10 and the second flap 20 are opened simultaneously in a state in which electric power is cut off from the solenoid 50 according to the present invention.

As shown in FIG. 4, in a general mode in which a vehicle engine is stopped or is in an idle state, or it is required to cool the engine, or the vehicle is being driven at a low speed, the first link 32 is moved downward by the actuator 40, thereby opening the first flap 10, and electric power is cut off from the solenoid 50, thereby moving the second link 34 downward and opening the second flap 20.

That is, in the above state, both the first flap 10 and the second flap 20 are opened and the amount of air that flows into the upper and lower air intake parts is increased to the maximum level. Further, in the above state, electric power is cut off from the solenoid 50, and so the first link 32 and the second link 34 are maintained in a state in which they are in simple contact with each other.

FIG. 5 is a view illustrating a state in which both the first flap 10 and the second flap 20 are closed simultaneously in a state in which electric power is applied to the solenoid 50 according to the present invention.

As shown in FIG. 5, in a mileage mode in which the vehicle is being driven at a speed of 80 KPH or higher (assuming that all elements of the vehicle, such as the temperature of engine coolant, are in a normal state), the first link 32 is moved upward by the actuator 40, and so the opening angle of the first flap 10 is reduced to a minimum angle. Further, in the mileage mode, electric power is applied to the solenoid 50, and so the second link 34 is moved upward, thereby reducing the opening angle of the second flap 20 to a minimum angle.

That is, electric power is applied to the solenoid 50, and so the first link 32 and the second link 34 are connected to each other. Thereafter, the actuator 40 is operated, and so the first link 32 is moved upward, and the second link 34 is moved upward in conjunction with the movement of the first link 32. Therefore, the opening angles of the first and second flaps 10 and 20 are reduced to minimum angles, thereby reducing the amount of air that flows into the upper and lower air intake parts to a minimum level.

FIG. 6 is a view illustrating a state in which the first flap 10 is closed while the second flap 20 is naturally opened in a state in which electric power is cut off from the solenoid 50 according to the present invention.

As shown in FIG. 6, when the first flap 10 that is installed in the upper part malfunctions or when it is required to open only the second flap 20 that is installed in the lower part (so as to cool a Power Electronics (PE) cooler or the like), the first link 32 is moved upward by the actuator 40 so as to minimize the opening angle of the first flap 10. However, in the above state, electric power is cut off from the solenoid 50, and so the second link 34 is moved downward, thereby opening the second flap 20.

In other words, when it is required to cool a PE cooler (normally installed in the lower part of the air intake unit) in a hybrid vehicle or etc., or when the first flap 10 that is installed in the upper part malfunctions and it is impossible to open the closed first flap 10, electric power is cut off from the solenoid 50 in response to a malfunction signal, and so the second flap 20 is naturally opened by the weight of both the second link 34 and the second flap 20, thereby realizing the fail-safe function.

Further, the active air flap device of the present invention is configured such that, during a fail-safe mode that performs the fail-safe function, the first flap 10 can be maintained in a closed state while the second flap 20 is opened, so the air blocking rate of the air intake unit during the fail-safe mode can be increased by 50% as compared with the general mode in which both the first and second flaps 10 and 20 are opened. Accordingly, during the fail-safe mode, the active air flap device can improve the aerodynamic performance of the vehicle and can increase the mileage of the vehicle.

Figure 7:
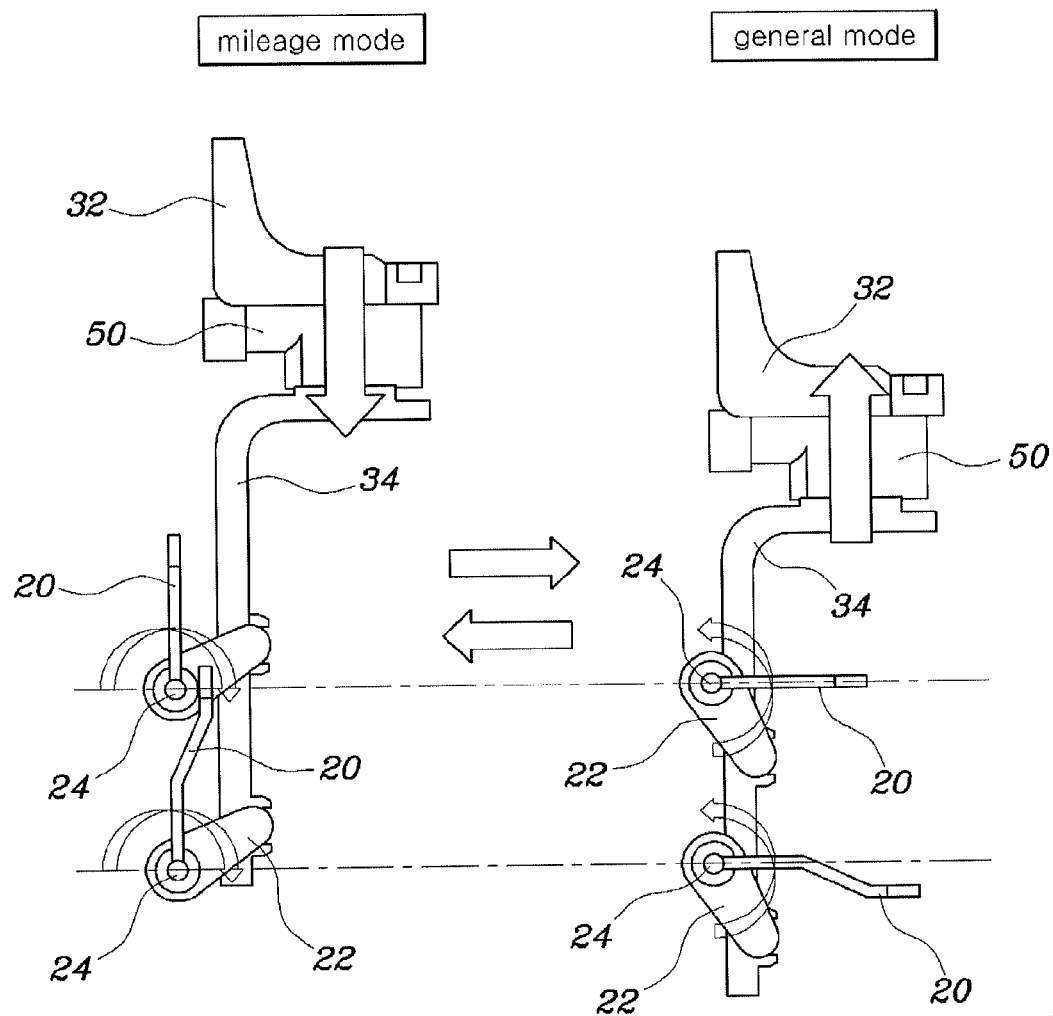
FIG. 7 is a view illustrating the operation of the first and second flaps when the operation mode of the active air flap device of FIG. 2 is switched between a mileage mode and a general mode.

FIG. 7 is a view illustrating the operation of the first flap 10 and the second flap 20 when the active air flap device according to the present invention is switched between the mileage mode and the general mode.

As shown in FIG. 7, in a state in which the second flap 20 has been maintained in an open state before the vehicle is started, when the operation mode is switched into the mileage mode after the vehicle is started, the first flap 10 is opened and the first link 32 is moved downward, and electric power is applied to the solenoid 50, and so an electromagnetic force is generated and connects the first link 32 and the second link 34 to each other.

When the first flap 10 in the above state is closed again, the second flap 20 is pulled upward, and so the second flap 20 is also closed. Here, in the mileage mode, the first flap 10 and the second flap 20 are continuously opened or closed in conjunction with each other by the operation of the actuator 40, the air blocking rate of the air intake unit based on time and surface area is maximized, thereby improving the aerodynamic performance of the vehicle and increasing the mileage of the vehicle.

Figure 8:
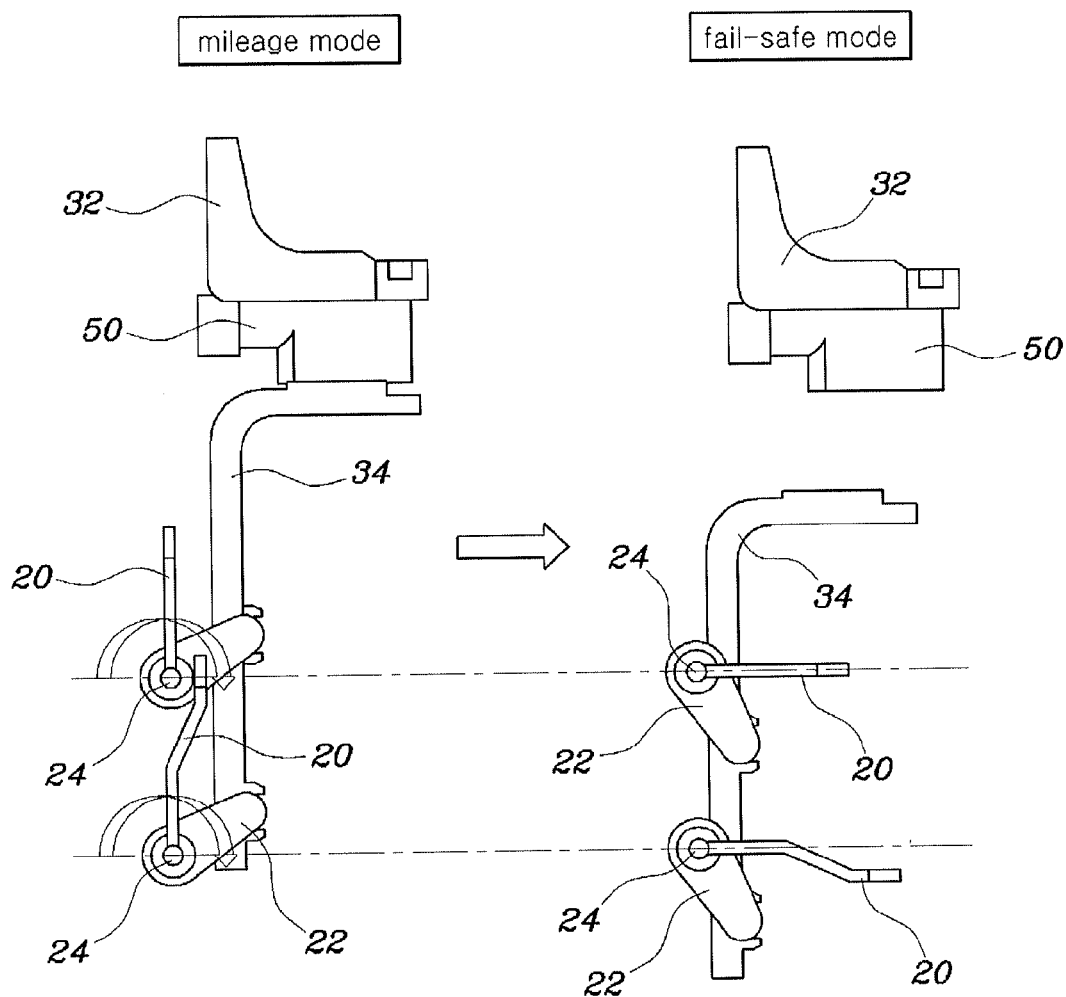
FIG. 8 is a view illustrating the operation of the first and second flaps when the operation mode of the active air flap device of FIG. 2 is changed from the mileage mode to a fail-safe mode.

FIG. 8 is a view illustrating the operation of the first flap 10 and the second flap 20 when the active air flap device according to the present invention is switched from the mileage mode to the fail-safe mode.

As shown in FIG. 8, in a mileage mode in which the first flap 10 and the second flap 20 are opened or closed in conjunction with each other, when the first flap 10 malfunctions (fails), or when it is impossible to open the closed first flap 10 or when it is required to cool a PE (Power-Electronics) cooler that functions to cool the electronic elements of a hybrid vehicle, electric power is cut off from the solenoid 50, the second flap 20 that is installed in the lower part is automatically opened by the weight thereof, thereby forming the minimum cooling surface area that is required to perform a cooling operation.

Further, the active air flap device is configured such that at least the first flap 10 can be maintained in a closed state in the mileage mode, so the air blocking rate of the air intake unit during the mileage mode can be increased by 50% as compared with the general mode. Accordingly, during the mileage mode, the active air flap device can improve the aerodynamic performance of the vehicle and can increase the mileage of the vehicle.

For convenience in explanation and accurate definition in the appended claims, the terms upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active air flap device for vehicles, comprising:
   a first flap installed in a front end of a vehicle and rotated by power of an actuator to open or close;
   a second flap installed at a location adjacent the first flap and configured such that the second flap rotates to open or close;
   a link module connected to the first flap at a first end thereof and connected to the second flap at a second end thereof, wherein the link module moves upward and downward; and
   a regulation unit provided in a central portion of the link module, wherein the regulation unit connects and disconnects a link of the first flap to or from a link of the second flap,
   wherein the link module comprises:
      a first link to a side of which an end of the first flap is connected so that, when the first link is moved upward or downward, the first link rotates the first flap so as to open or close the first flap; and
      a second link installed at a location below the first link such that the second link is detachably attached to the first link, in which an end of the second flap is connected to a side of the second link so that, when the second link is moved upward or downward, the second link rotates the second flap so as to open or close the second flap, and
   the regulation unit is a solenoid that is installed in an end of the first link or in an end of the second link which faces the end of the first link, and so the solenoid connects or disconnects the first link and the second link to or from each other by whether electric power has been applied to the solenoid or not.

2. The active air flap device for vehicles as set forth in claim 1, wherein a metal plate that can be magnetically attached to a magnet is installed in the end of the first link which faces the solenoid or in the end of the second link which faces the solenoid.

3. The active air flap device for vehicles as set forth in claim 1, wherein
   the second flap is mounted to a rotating shaft that is provided in a first end of a lever; and
   the second link is connected to a second end of the lever, and so, when the second link is disconnected from the first link, the second end of the lever is rotated downward around the rotating shaft by a weight of the second link, thereby opening the second flap.

4. The active air flap device for vehicles as set forth in claim 1, further comprising:
   a control unit that is connected to the solenoid and outputs a signal so as to apply or cut off the electric power to or from the solenoid.

5. The active air flap device for vehicles as set forth in claim 4, wherein the control unit controls such that,
   when the electric power is applied to the solenoid, the first link and the second link are connected to each other and the first flap and the second flap are opened or closed in conjunction with each other by the power of the actuator; and
   when the electric power is cut off from the solenoid, the first link and the second link are disconnected from each other, and the second flap is rotated by a weight of the second link, thereby being automatically opened.

* * * * *